(12) United States Patent
Paxton et al.

(10) Patent No.: US 8,115,477 B2
(45) Date of Patent: Feb. 14, 2012

(54) SHAFT SPEED SENSOR WITH ANALOG OUTPUT

(75) Inventors: Kris Paxton, Bloomington, MN (US); Bradley D. Slye, Plymouth, MN (US)

(73) Assignee: Electro-Sensors, Inc., Minneapolis, MN (US)

(*) Notice: Subject to any disclaimer, the term of this patent is extended or adjusted under 35 U.S.C. 154(b) by 414 days.

(21) Appl. No.: 12/426,380

(22) Filed: Apr. 20, 2009

(65) Prior Publication Data

US 2010/0264908 A1 Oct. 21, 2010

(51) Int. Cl.
G01P 3/54 (2006.01)

(52) U.S. Cl. .................................. 324/173; 324/166

(58) Field of Classification Search .......... 324/173–174, 324/207.25, 244.1, 166
See application file for complete search history.

(56) References Cited

U.S. PATENT DOCUMENTS

| | | | |
|---|---|---|---|
| 3,826,985 A | 7/1974 | Wiley | |
| 4,127,812 A | 11/1978 | Baliguet | |
| 4,355,364 A * | 10/1982 | Gudat | ............ 702/145 |
| 5,384,534 A | 1/1995 | Bjork | |
| 5,703,483 A | 12/1997 | Bernard et al. | |
| 6,144,116 A | 11/2000 | Berger et al. | |
| 6,628,741 B2 | 9/2003 | Netzer | |
| 7,021,127 B2 | 4/2006 | Schroeder et al. | |
| 7,132,939 B2 | 11/2006 | Tyndall et al. | |
| 2006/0033642 A1 | 2/2006 | Calderone et al. | |

* cited by examiner

*Primary Examiner* — Jay Patidar
(74) *Attorney, Agent, or Firm* — Leffert Jay & Polglaze, P.A.

(57) ABSTRACT

A 2-wire, loop-powered shaft rotational speed sensor device that outputs a 4-20 mA current in response to the shaft rotational speed. The device is comprised of a sensor (e.g., magnetic, optical) that senses an output from a sensor disk (e.g., magnetic, optical) and outputs a series of voltage pulses whose frequency varies with the shaft rotational speed. A microcontroller measures this pulse frequency and generates a digital code representative of that frequency. A digital-to-analog converter generates an analog waveform in response to the digital code. A loop-powered, voltage-to-current circuit generates the output current in response to the analog waveform.

20 Claims, 4 Drawing Sheets

100

SHAFT SPEED SENSOR WITH ANALOG OUTPUT

BACKGROUND

I. Field of the Invention

The present invention relates generally to sensors and more particularly to shaft speed sensors.

II. Description of the Related Art

It is sometimes desirable, in systems that use rotating shafts in bearings, to monitor the rotational speed of the shafts. The monitoring can provide feedback to the system controller regarding the operational status of the shaft. The controller can then vary the speed of the shaft in order to produce the desired effect on the system.

Currently, an analog representation of rotating shaft speed can be generated only from a separate pulse-frequency-output sensor and a pulse-frequency-input to analog-output signal-conditioner module. However, it is desirable to monitor shaft speed using a minimum of components to reduce the size and price of the sensor. Accordingly, there is a need in the art for a self-contained sensor to monitor shaft rotational speed.

SUMMARY

The present invention encompasses a self-contained, loop-powered, 4-20 mA output shaft rotational-speed sensor. The device comprises a sensor that detects a shaft mounted target and outputs a voltage pulse frequency proportional to shaft rotational speed. A controller circuit, coupled to the sensor, generates a digital code representative of the angular speed. A digital-to-analog converter, coupled to the controller circuit, generates an analog voltage signal in response to the digital code. A voltage/current circuit, coupled to the digital-to-analog converter, generates an output current, within a predetermine range, in response to the analog voltage signal.

DETAILED DESCRIPTION

Figure 1:
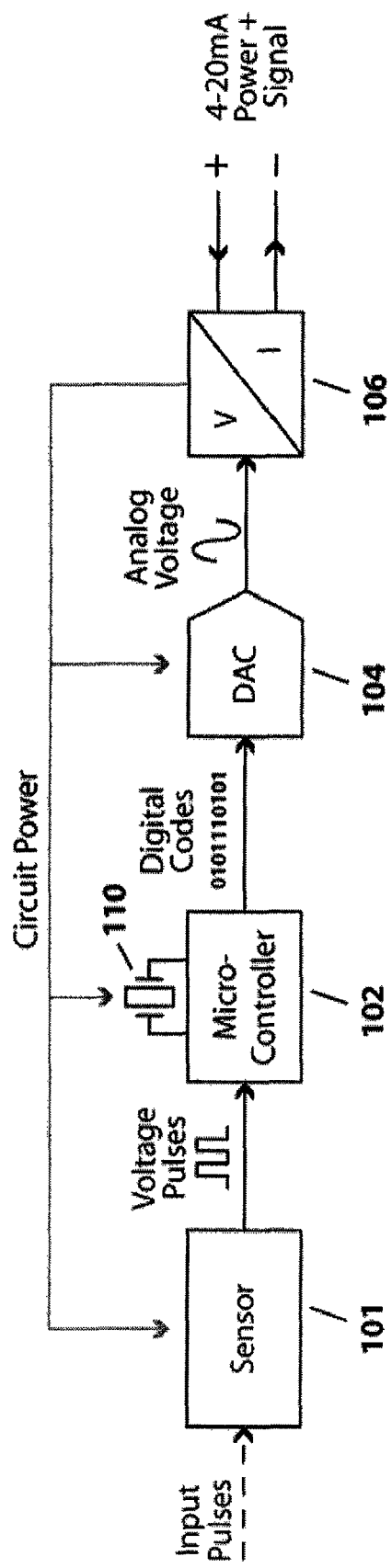
FIG. 1 shows a circuit block diagram of one embodiment of a shaft speed sensor device with an analog output.
Figure 4:
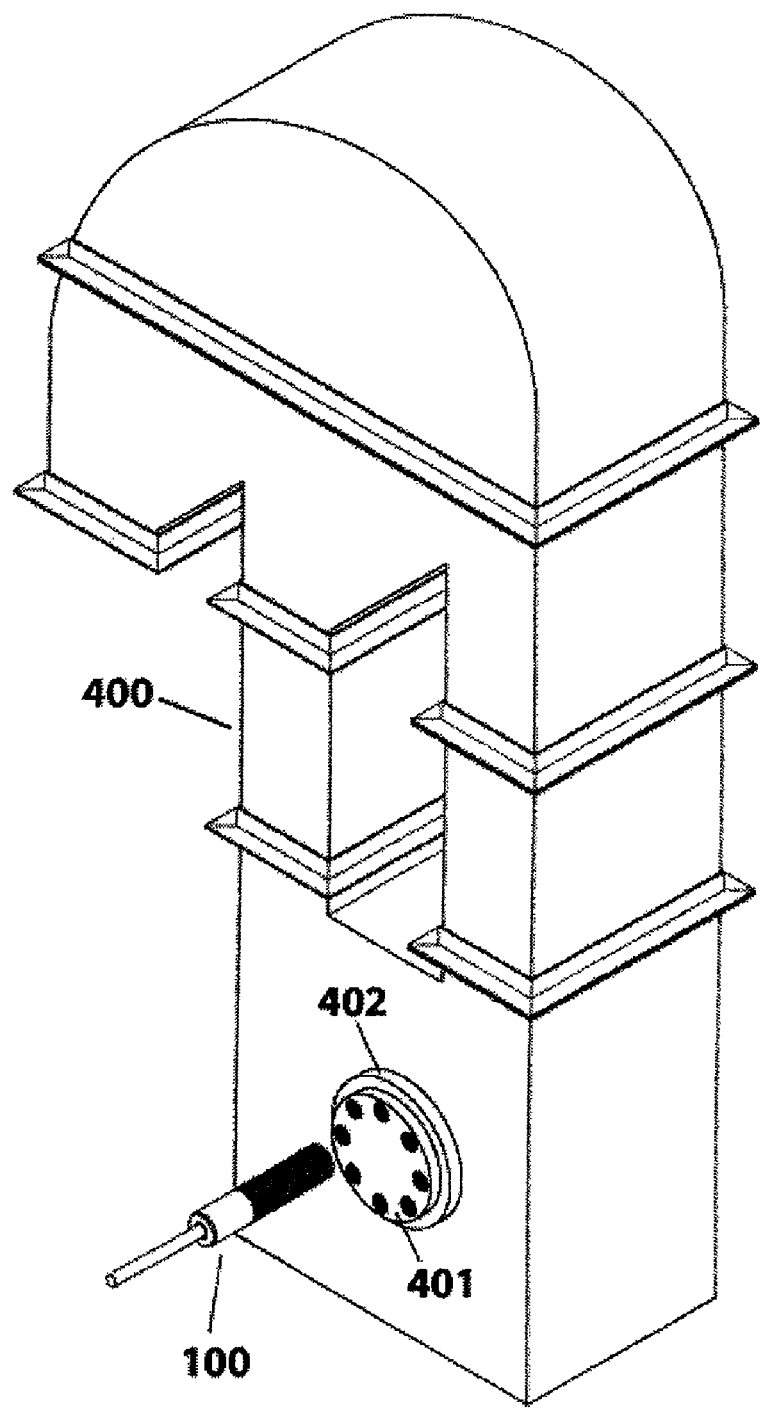
FIG. 4 shows one embodiment of the shaft speed sensor of the present invention incorporated into a conveyor system.

FIG. 1 illustrates a circuit block diagram of one embodiment of the shaft speed sensor device 100 with analog output. The sensor is comprised of a magneto-resistive sensor 101 that detects magnetic pulses from embedded magnets in a shaft-mounted pulser target. An example of one such shaft-mounted pulser target is illustrated in the system of FIG. 4 that is discussed subsequently. Such a pulser target can be comprised of a plurality of magnets mounted equal distances apart on a disk that is coupled to the shaft being monitored. As a magnet rotates past the sensor the shaft speed sensor device 100, the magneto-resistive sensor 101 outputs a voltage pulse. The voltage pulse frequency output by the sensor 101 is then directly proportional to the shaft RPM. The sensor thus detects shaft angle changes.

The present invention is not limited to using only a disk with magnets and a magnetic sensor. Other forms of detecting the shaft angle change of the shaft can be used including an optical disk that generates light pulses at predetermined intervals or a contact disk that generate electrical contact with the sensor 101 at predetermined intervals. Any means for generating input pulses spaced a predetermined distance apart can be used.

A controller 102, such as a microcontroller circuit, is coupled to the magneto-resistive sensor 101 and monitors the sensor's output. The controller 102 measures the shaft angular speed and generates a digital code representation of that angular speed. This is accomplished by the controller 102 continuously receiving and timing the voltage pulse frequency using a crystal-based 110 timer that is internal to the controller. In one embodiment, the microcontroller determines the voltage pulse frequency and outputs a digital pulse frequency code, indicative of that frequency, every 8.192 ms. The frequency code is in a binary format. Alternate embodiments can use other number bases.

A digital-to-analog converter (DAC) 104 is coupled to the microcontroller 102. The DAC 104 converts the digital code from the microcontroller 102 to an analog voltage signal.

A loop-powered voltage-to-current circuit (V/I) 106 is coupled to the DAC 104. The DAC 104 is coupled to the voltage part of the V/I circuit which converts the analog voltage signal to a corresponding 4-20 mA current as used in a typical industrial analog signaling standard. The V/I circuit 106 is configured to perform multiple functions.

One function of the V/I circuit 106 is to supply power to the prior circuit elements 101, 102, 104 so that the shaft speed sensor device is self-powering. All of the circuitry together draws less than 4 mA and the V/I circuit is calibrated to draw a precise 4 mA "floor" current from which all circuit power is taken.

Another function of the V/I circuit 106 is to convert the DAC analog voltage signal to a 0-16 mA signal current that is added to the 4 mA floor current to give the 4-20 mA variable output current based on the input rotation speed of the shaft. The current flow is linearly proportional to the magnetic pulse frequency between the specified minimum and maximum pulse frequencies. In this 2-wire, loop-powered, 4-20 mA circuit, circuit power and analog signal are together in the same 4-20 mA current.

Figure 2:
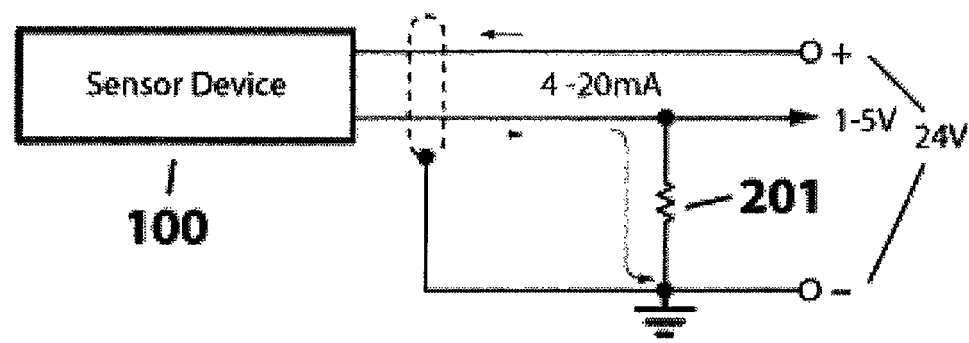
FIG. 2 shows a circuit diagram of one embodiment of the shaft speed sensor of the present invention incorporated into a loop power circuit.

FIG. 2 illustrates a circuit diagram of one embodiment of the shaft speed sensor device 100 of the present invention incorporated into a 4-20 mA current-loop circuit. A DC power supply (e.g., 24V) (+) terminal is coupled to the sensor (+) terminal. A current sense resistance 201 (e.g., 250 Ohm resistor) is coupled in series between the sensor (−) terminal and the DC power supply (−) terminal as shown. The resulting 1-5 volts across the resistor is an easily measurable representation of rotating shaft speed.

Figure 3:
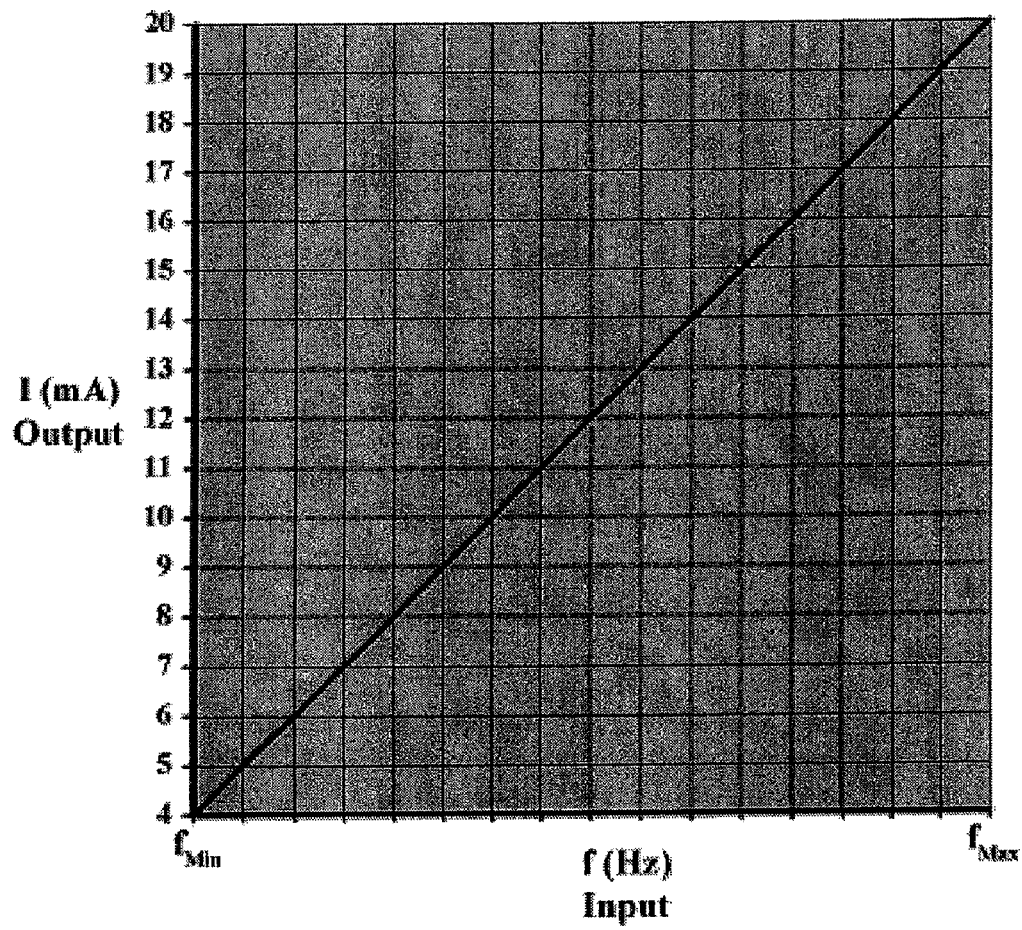
FIG. 3 shows a graph of the input versus output of the shaft speed sensor of the present invention.

FIG. 3 illustrates a graph of one embodiment of an input pulse frequency versus an output current. The graph shows that as the frequency along the x-axis increases, the current along the y-axis increases linearly.

FIG. 4 illustrates one embodiment of a conveyor system 400 using the shaft speed sensor device 100 of the present invention. However, the present invention is not limited to any one type of system. Any system requiring monitoring of a shaft speed is encompassed by the present invention.

The illustrated embodiment uses a disk 401 with magnets, optics or some other means for generating a pulse frequency input to the sensor device 100, mounted on a shaft 402. The magnets are mounted a fixed distance apart around the periphery of the disk 401. The speed of the shaft 402 sets the angular speed of the magnets and, thus, the magnetic pulse frequency detected by the sensor device 100. The sensor device 100, mounted close enough to detect the disk magnets, then outputs a current in the 4-20mA range as discussed previously. This signal can then be used by the system controller (not shown), connected to the sensor, to adjust the rotational speed of the shaft.

Numerous modifications and variations of the present invention are possible in light of the above teachings. It is therefore to be understood that within the scope of the appended claims, the invention may be practiced otherwise than as specifically described herein.

What is claimed is:

1. A shaft speed sensor device comprising:
   a sensor for detecting a shaft angle change;
   a controller circuit, coupled to the sensor, for measuring an angular speed of the shaft and generating a digital code representation of the angular speed;
   a digital-to-analog converter, coupled to the controller circuit, for generating an analog voltage signal in response to the digital code; and
   a voltage-to-current circuit, coupled to the digital-to-analog converter, for generating an output current within a predetermine range in response to the analog voltage signal.

2. The device of claim 1 wherein the shaft angle change is represented by magnetic pulses.

3. The device of claim 1 wherein the shaft angular change is represented by light pulses.

4. The device of claim 1 wherein the predetermine range is 4-20 mA.

5. The device of claim 1 wherein the sensor for detecting the shaft angle changes detects input pulses.

6. The device of claim 5 wherein the input pulses are one of light pulses or magnetic pulses.

7. The device of claim 1 wherein the voltage-to-current circuit supplies power to the sensor, the controller circuit, and the digital-to-analog converter.

8. A shaft speed sensor device comprising:
   a magneto-resistive sensor for detecting magnetic pulses, the frequency of the magnetic pulses varying with the speed of the shaft;
   a microcontroller, coupled to the magneto-resistive sensor, for generating a digital code representation of the magnetic pulses;
   a digital-to-analog converter, coupled to the controller circuit, for generating an analog voltage in response to the digital code; and
   a voltage-to-current circuit, coupled to the digital-to-analog converter, for generating an output current, within a predetermine range, in response to the analog voltage.

9. The device of claim 8 wherein the digital code is generated as a binary number.

10. The device of claim 8 wherein the magneto-resistive sensor is configured to generate voltage pulses in response to the magnetic pulses.

11. The device of claim 9 wherein the microcontroller is configured to determine a frequency of the voltage pulses and generate the digital code that is indicative of the frequency of the voltage pulses.

12. The device of claim 11 wherein the microcontroller outputs the digital code every 8.192 ms.

13. The device of claim 8 wherein the voltage-to-current circuit is a 2-wire, loop-powered circuit.

14. A shaft driven system comprising:
   a shaft configured to rotate at different angular speeds;
   a sensor disk coupled to the shaft,
   a shaft speed sensor device located in proximity to the sensor disk to sense an indication from the sensor disk that is indicative of the shaft angular speed, the device comprising:
   a sensor for detecting the angular speed of the shaft and outputting a voltage pulse frequency in response to the angular speed;
   a controller circuit, coupled to the sensor, for generating a digital code in response to the angular speed;
   a digital-to-analog converter, coupled to the controller circuit, for generating an analog voltage signal in response to the digital code; and
   a loop-powered voltage-to-current circuit, coupled to the digital-to-analog converter, for generating an output current within a predetermine range in response to the analog voltage signal.

15. The conveyor system of claim 14 wherein the shaft driven system is a conveyor system.

16. The conveyor system of claim 14 wherein the controller circuit comprises a crystal-based timer.

17. The conveyor system of claim 16 wherein the controller circuit is configured to continuously receive and time the voltage pulse frequency using the crystal-based timer.

18. The conveyor system of claim 17 wherein the controller circuit is a microcontroller that determines the voltage pulse frequency and outputs the digital code indicative of the voltage pulse frequency every 8.192 ms.

19. The conveyor system of claim 14 wherein the sensor disk outputs one of light pulses or magnetic pulses with a frequency indicative of the shaft angular speed.

20. The conveyor system of claim 14 and further comprising a current sense resistance coupled in series with the sensor device and a DC power supply.

* * * * *